United States Patent
Liu et al.

(10) Patent No.: US 11,228,827 B2
(45) Date of Patent: Jan. 18, 2022

(54) MICROPHONE MODULE FOR COMPUTING DEVICE

(71) Applicant: Hewlett-Packard Development Company, L.P., Spring, TX (US)

(72) Inventors: Chyun Nan Liu, Houston, TX (US); Chung Hua Ku, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 16 days.

(21) Appl. No.: 16/603,287

(22) PCT Filed: Apr. 24, 2017

(86) PCT No.: PCT/US2017/029204
§ 371 (c)(1),
(2) Date: Oct. 7, 2019

(87) PCT Pub. No.: WO2018/199906
PCT Pub. Date: Nov. 1, 2018

(65) Prior Publication Data
US 2021/0112325 A1 Apr. 15, 2021

(51) Int. Cl.
*H04R 1/04* (2006.01)

(52) U.S. Cl.
CPC ........... *H04R 1/04* (2013.01); *H04R 2420/09* (2013.01)

(58) Field of Classification Search
None
See application file for complete search history.

(56) References Cited

U.S. PATENT DOCUMENTS

| | | |
|---|---|---|
| 8,432,485 B1 | 4/2013 | Martinez et al. |
| 8,988,532 B2 | 3/2015 | Soffer |
| 9,158,496 B2 | 10/2015 | Soffer |
| 9,446,510 B2 | 9/2016 | Vu et al. |
| 2005/0037823 A1 | 2/2005 | Seshadri et al. |
| 2008/0123891 A1 | 5/2008 | Kato et al. |
| 2011/0123018 A1 | 5/2011 | Chuang et al. |
| 2014/0112518 A1 | 4/2014 | Lee |

FOREIGN PATENT DOCUMENTS

| | | |
|---|---|---|
| CN | 100419629 | 9/2008 |
| CN | 104486478 | 4/2015 |

OTHER PUBLICATIONS

Mic Drop: How to Keep Snoops From Listening to Your Laptop, Jul. 5, 2016, http://www.macworld.com/article/3091124/macs/mic-drop-how-to-keep-snoops-from-listening-to-your-laptops-microphone.html.

*Primary Examiner* — Kenny H Truong
(74) *Attorney, Agent, or Firm* — HPI Patent Department

(57) ABSTRACT

A computing device includes a housing and a microphone module. The microphone module may be connected to the housing and selectively manipulated between an attached and detached state. In an attached state, the microphone of the microphone module is operatively linked to one or more electrical components of the housing. In a detached state, the microphone is disconnected from the one or more electronic components.

11 Claims, 6 Drawing Sheets

MICROPHONE MODULE FOR COMPUTING DEVICE

BACKGROUND

Microphones are common hardware components of laptops and other personal computer systems. Typically, microphones are embedded components which can be activated through programmatic triggers and normal use of the computer system.

DETAILED DESCRIPTION

Examples are described for a computing device that provides a security feature for a microphone of a computing device.

According to some examples, a computing device includes a housing and a microphone module. The housing includes one or more electrical components which connect to a microphone of the microphone module. The microphone module is manipulatable by a user to enable the microphone to be operatively connected and disconnected.

In some examples, the microphone module connects to the housing and is selectively manipulatable between an attached state and a detached state. In the attached state, the microphone module is operatively linked to the one or more electrical components of the housing of the computing device. In the detached state, the microphone module is disconnected from the one or more electrical components of the housing.

Some examples described herein can generally require the use of computing devices, including processing and memory resources. For example, one or more examples described herein may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 1A:
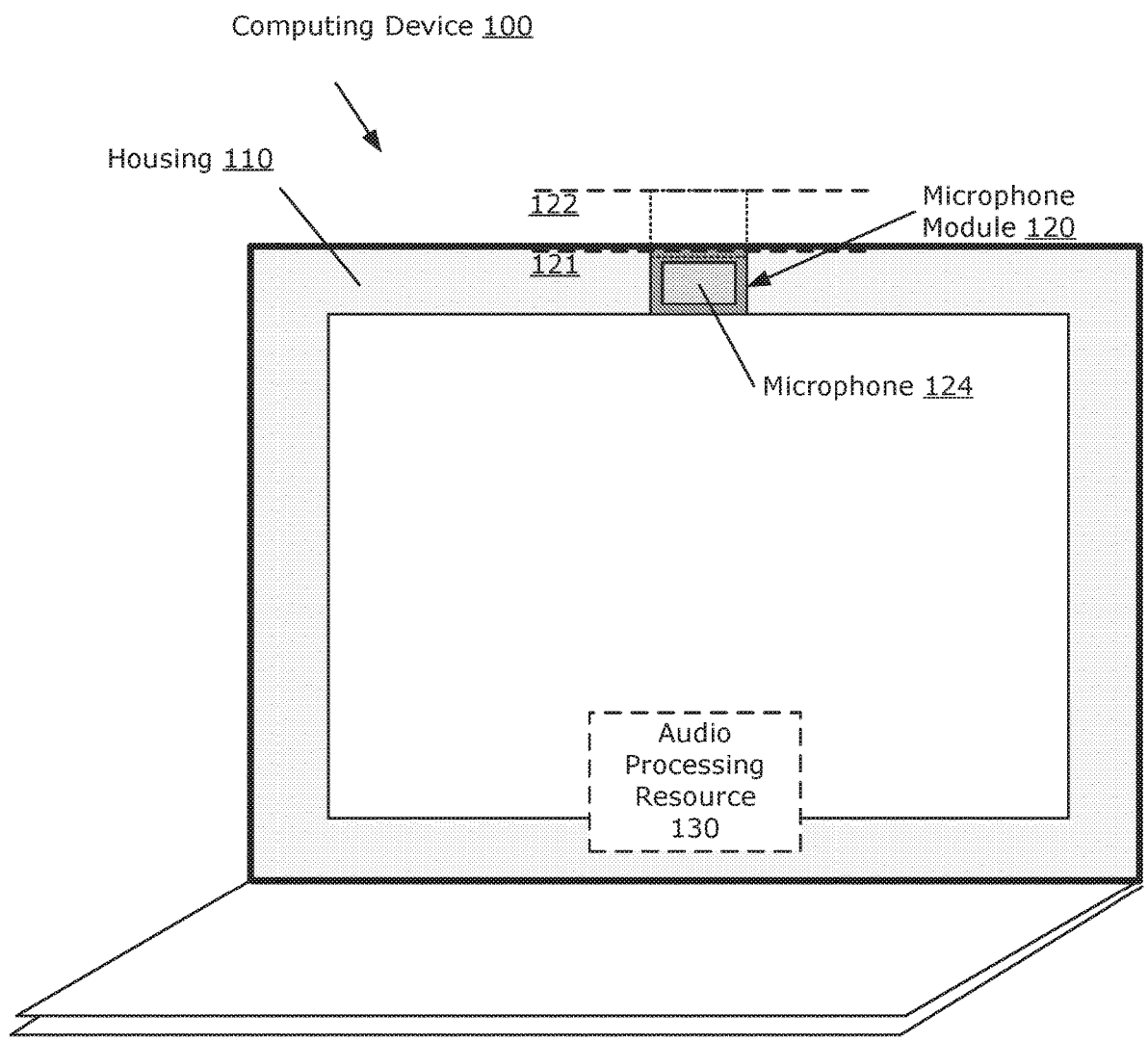
FIG. 1A illustrates an example of a computing device with a microphone module in an attached state, according to an example.
Figure 1B:
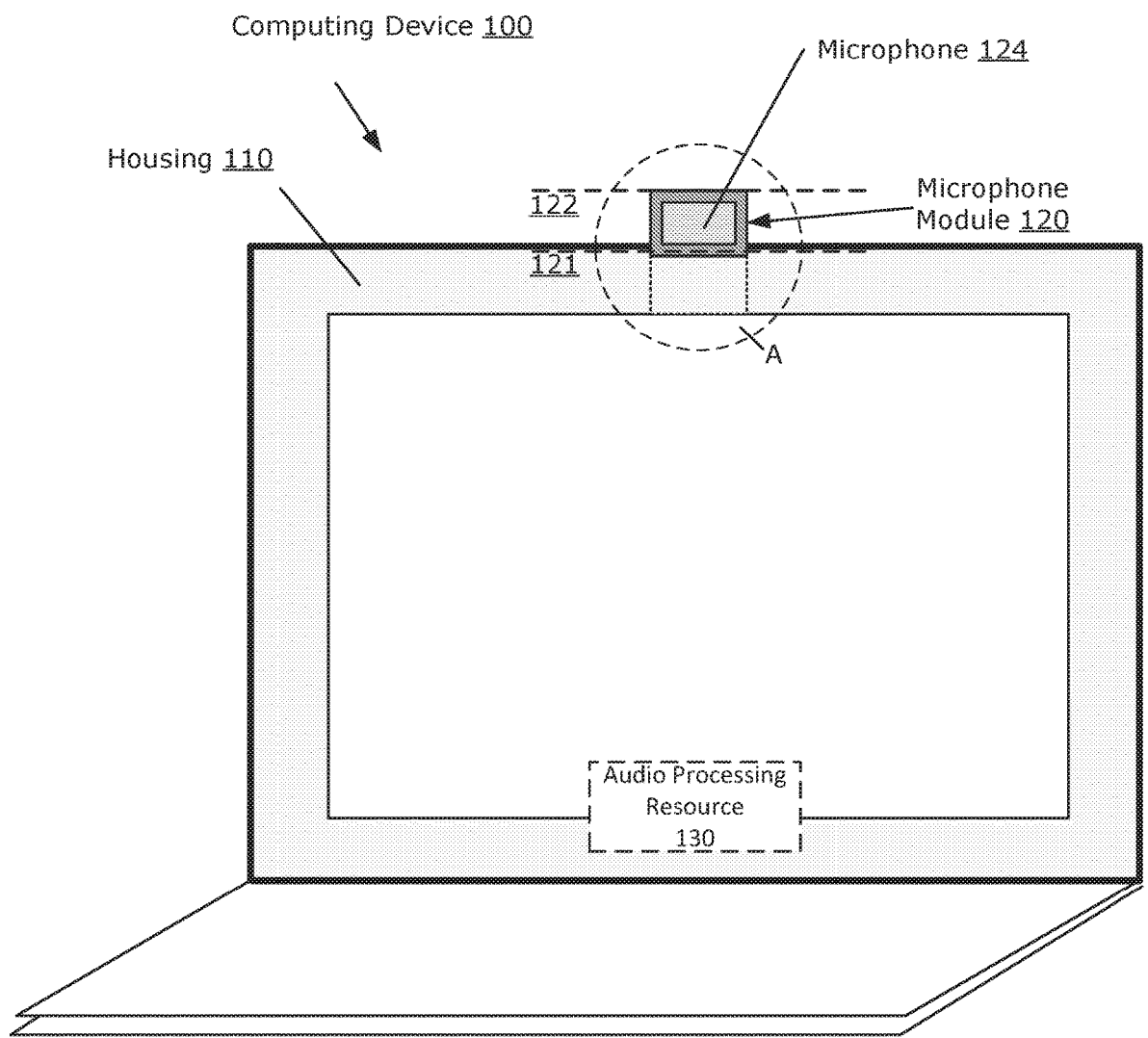
FIG. 1B illustrates the computing device of FIG. 1A with the microphone module in a detached state.
Figure 1C:
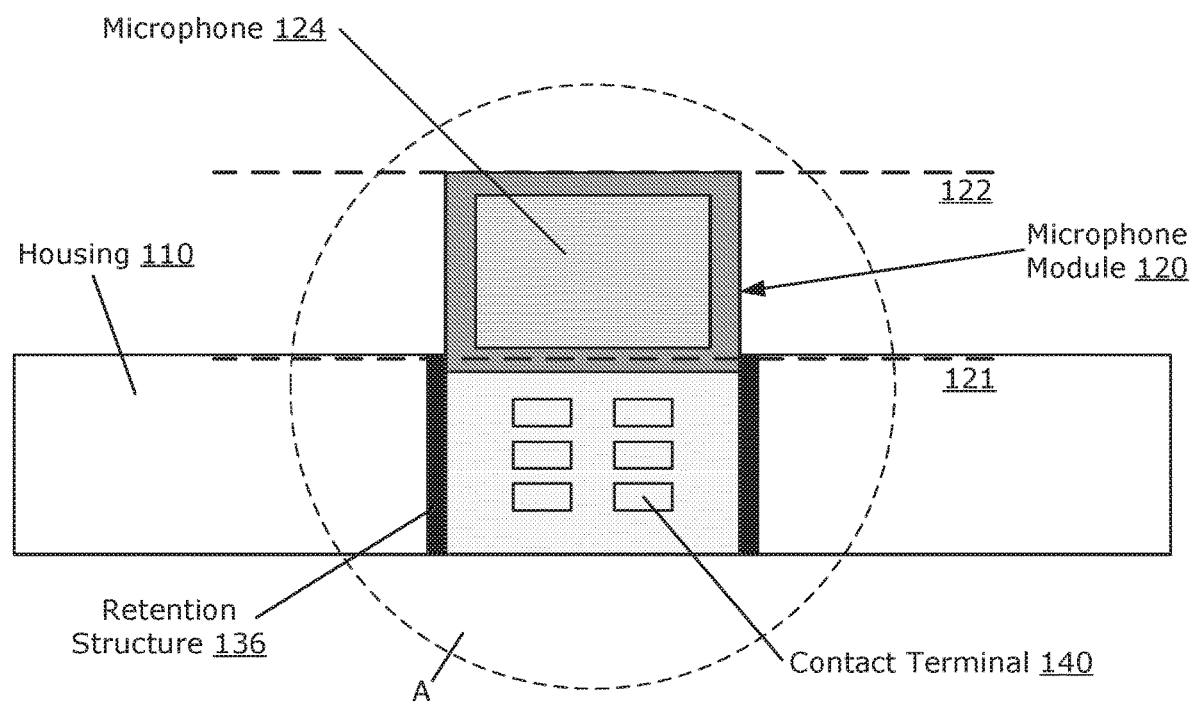
FIG. 1C illustrates a close-up view of region A.

FIG. 1A through FIG. 1C illustrate an example computing device with a manipulatable microphone module. A computing device 100, as shown with the examples of FIG. 1A through FIG. 1C, may correspond to, for example, a desktop computer, laptop, notebook, tablet or other type of computer device.

FIG. 1A illustrates an example of a computing device with a microphone module in an attached state, according to an example. FIG. 1B illustrates the computing device of FIG. 1A with the microphone module in a detached state. With reference to examples of FIG. 1A and FIG. 1B, the computing device 100 includes a housing 110 that retains a microphone module 120 on a perimeter surface or edge. The housing 110 retains electrical components, such as a processor, memory, integrated circuitry and other resources, to enable use of the computing device 100. The electrical components can include audio processing resources 130 to process an audio input signal that is received through the microphone 124 of the microphone module 120 (audio signal line not shown). The audio processing resources 130 and other electrical components may include hardware elements, circuitry and/or logical components (e.g., microprocessor) to enable the microphone module 120 to electrically connect to the computing device 100.

As described with various examples, the microphone module 120 can be manipulated between an attached state and a detached state. Depending on implementation, the attachment and/or detachment of the microphone module 120 from the housing 110 can be accomplished in a variety of ways through the selective manipulation of the microphone module 120 by a user. For example, FIG. 1A and FIG. 1B illustrate a microphone module 120 manipulated from an attached position (e.g., position 121) to a detached position (e.g., position 122). In the attached state of FIG. 1A, the microphone 124 of the microphone module 120 is operatively linked to the audio processing resources 130 of the housing 110. By establishing the operative link between the microphone 124 and the audio processing resources 130 of the housing 110, the computing device 100 has the capability to recognize and utilize the microphone as the microphone of the computing device 100 (e.g., online meetings, video conferencing, etc.).

Examples recognize that under conventional approaches, computing devices include functionality that can programmatically, and sometimes serendipitously, activate use of a microphone. The issue of unauthorized microphone access becomes more apparent for conventional computing devices which embed the microphone in the computing device housing, where it is both difficult to see and inaccessible to the user. Moreover, in many conventional designs, the microphone maintains constant electrical connectivity with the audio processing resources of the host computing device. In some conventional devices, the "always on" capability of the microphone creates additional security vulnerabilities for the microphone in that the microphone can be remotely or programmatically controlled to record audio surrounding the user (e.g., "wiretapping" the microphone).

Among other benefits, some examples recite that the microphone module 120 can attach and detach the microphone 124 with respect to the housing 110. Additionally, in some examples, while the microphone 124 may be detached (e.g., in a detached state), the microphone module 120 remains attached, but the microphone 124 is not operable and cannot be subjected to unauthorized use. In this way, the microphone module 120 enables the microphone 124 to be attached and detached, while maintaining the microphone 124 in the grasp of a structure of the microphone module 120.

FIG. 1C illustrates a close-up view of region A of FIG. 1B. Among other benefits, the microphone module 120 can be selectively manipulated to detach or disconnect from the one or more electrical components of the housing 110. More specifically, the detached state prevents an electrical connection from being formed between the microphone 124 of the microphone module 120 and a contact terminal 140 (or set of multiple contact terminals) of the housing 110.

In an example of FIG. 1C, the microphone module 120 is depicted in the detached state (as indicated by position 122), so as to expose the contact terminal(s) 140. For example, a retention structure 136 of the microphone module 120 may physically suspend the microphone 124 when in the detached state, in order to separate or misalign a contact terminal (not visible in FIG. 1C) of the microphone module 120 with the contact terminal(s) 140 of the housing 110. In this way, the retention structure 136 prevents an electrical connection from being formed between the microphone 124 and the computing device 100. In the detached state of position 122, the microphone module 120 can maintain a separation between the microphone 124 and the contact terminal(s) 140 of the housing 110. Also, in the detached state of position 122, the microphone module 120 can maintain an alignment that prevents formation of an electrical connection between the contact terminal(s) 140 and the microphone 124. In some examples, the retention structure 136 may extend from the housing 110 to retain the microphone module 120 in a detached state (e.g., protruding from the housing). Example retention structures include snap-in/pop-out mechanisms, swinging mechanisms, magnetic fasteners, rails, springs, push buttons, etc.

With reference to FIG. 1A through FIG. 1C, the microphone module 120 can be structured to visually indicate the detached state to a user. For example, the microphone module 120 can partially protrude from the housing 110 to serve as a visual indication that the microphone module 120 is in a detached state. Other examples of structuring the microphone module 120 to visually indicate the detached state to the user include displaying the contact terminals (not visible in FIG. 1C) of the microphone module 120 or the contact terminals 140 of the housing 110.

In addition, with reference to FIG. 1A and FIG. 1B, the location of the microphone module is not limited to the location of the microphone module 120 in relation to the housing 110. The microphone module location can include any location on the computing device (e.g. near a display screen, near a keyboard, etc.).

Figure 2A:
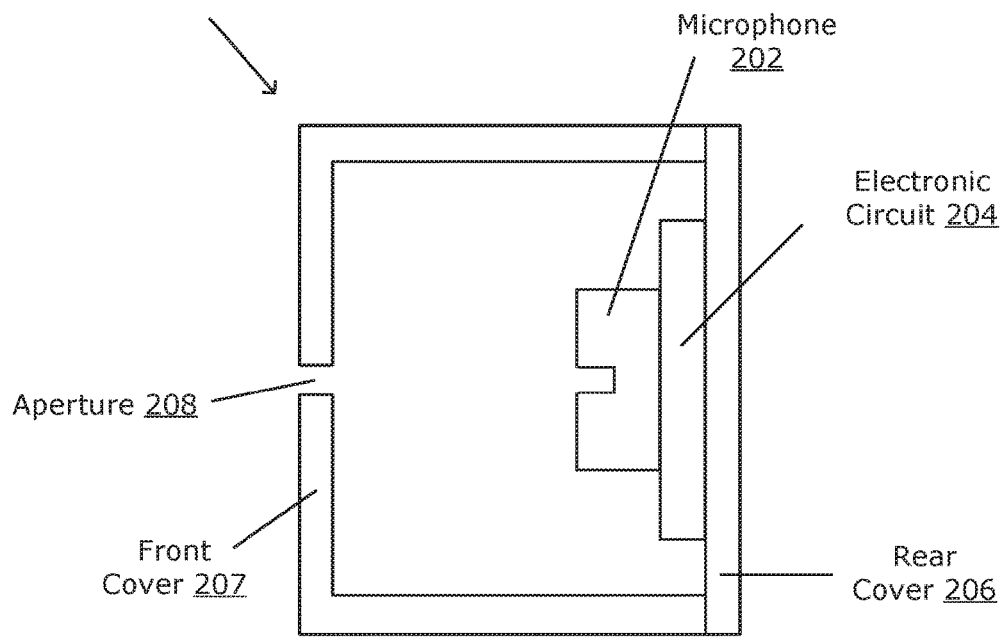
FIG. 2A illustrates an example microphone module for a computing device.
Figure 2B:
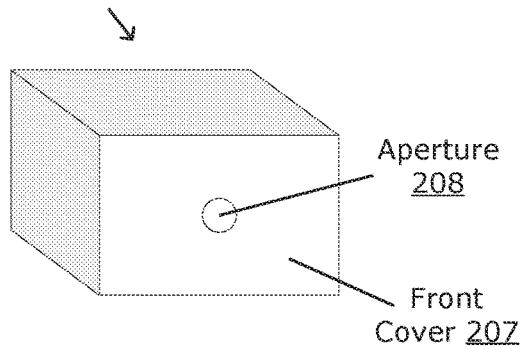
FIG. 2B illustrates a front cover of the microphone module of FIG. 2A.
Figure 2C:
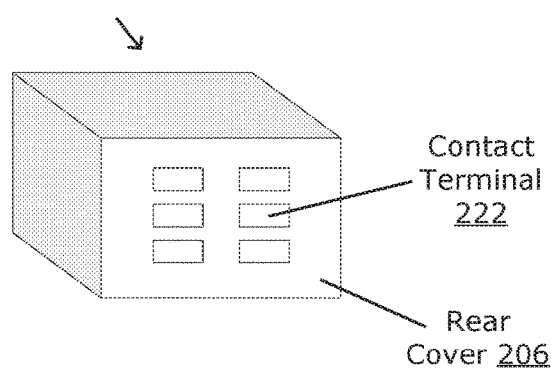
FIG. 2C illustrates a rear cover of the microphone module of FIG. 2A.

FIG. 2A through FIG. 2C illustrate an example microphone module, for use with a computing device such as shown with an example of FIG. 1. With reference to FIG. 2A, a microphone module 200 can include a microphone 202, an electronic circuit 204, a front cover 207, a rear cover 206 and an aperture 208. The microphone 202 captures audio input and transmits the captured input as electric signals to the audio processing resources of a corresponding computing device.

According to some examples, the microphone 202 is connected to an electronic circuit 204. The electronic circuit 204 supports and enables the microphone 202 to electronically connect to the one or more electrical components of the housing. The electronic circuit 204 may correspond to any class of electronic circuit, including rigid (e.g., printed circuit board) or flexible printed circuits.

With further reference to an example of FIG. 2A, the electronic circuit 204 is connected to the rear cover 206. The rear cover 206 supports the microphone 202 and the electronic circuit 204. Also, as illustrated in FIG. 2C, the rear cover 206 may include contact terminals 222 that connect to a corresponding set of contact terminals 140 (FIG. 1C) of the housing 110 in order to facilitate the electrical connection between the microphone 202 and the audio processing resources 130 (FIG. 1A and FIG. 1B) maintained by the computing device housing 110 (FIG. 1A through FIG. 1C). The rear cover 206 may be joined to the front cover 207 (e.g., glue, ultrasonic welding, etc.) to seal the microphone 202 and the electronic circuit 204 within the microphone module 200. As illustrated in FIG. 2A and FIG. 2B, the front cover 207 can include an aperture 208 to allow sound waves to reach the microphone 202. In some examples, the microphone module 200 does not include a rear cover, where the electronic circuit 204 itself joins to the front cover 207 to seal the microphone module 200 and to connect to the one or more electronic components of the housing 110.

While some examples, such as shown with FIG. 1A through FIG. 1C provide for the microphone module 120 to enable linear (e.g., slot) motion of the microphone 124 between an attached and detached state, in variations, the microphone module 120 may retain and enable other types of manipulations to position/align the microphone 124 into and out of connection with the audio processing resources 130 of the computing device 100. In variations, for example, the microphone module 120 may be selectively manipulated by a user through actions that include removing the microphone 124 from the retention structure 136. Alternatively, the retention structures 136 can be structured to physically suspend the microphone 124 within the confines of the microphone module 120 when in the detached state.

Figure 3A:
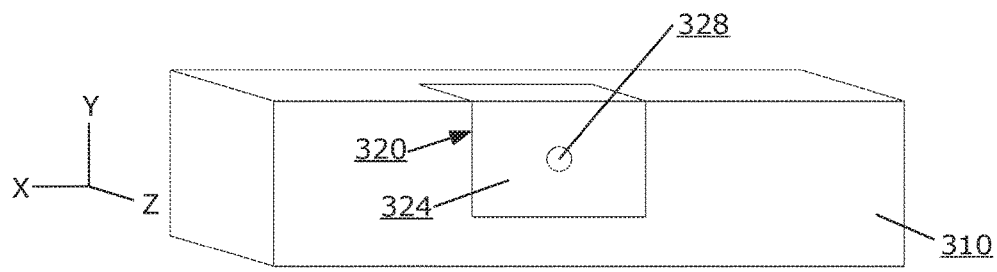
FIG. 3A illustrates an example microphone module in a first attached state.

FIG. 3A through FIG. 3D illustrate use of a manipulatable microphone module having multiple alternative detached and/or misaligned states. In examples of FIG. 3A through FIG. 3D, a microphone module 320 includes façades 324 (front) and 326 (rear) which seat within an opening 312 of the housing 310. In FIG. 3A, the microphone module 320 is retained in an operative or attached state within the opening 312, exposing the front façade 324 and an aperture 328 being oriented to capture audio from the environment.

Figure 3B:
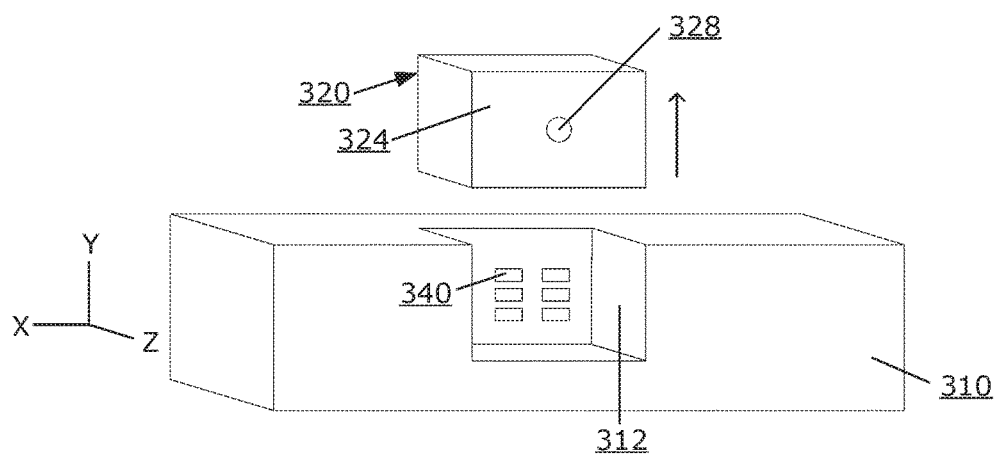
FIG. 3B illustrates the microphone module of FIG. 3A in a first detached state.

FIG. 3B shows the microphone module 320 manipulated by linear translation along the Y axes into a detached or non-operative state. In some variations, the microphone module 320 may be manipulated into being removed from the housing 310. Once removed, the contact terminals 340 of the housing 310 may be exposed.

Figure 3C:
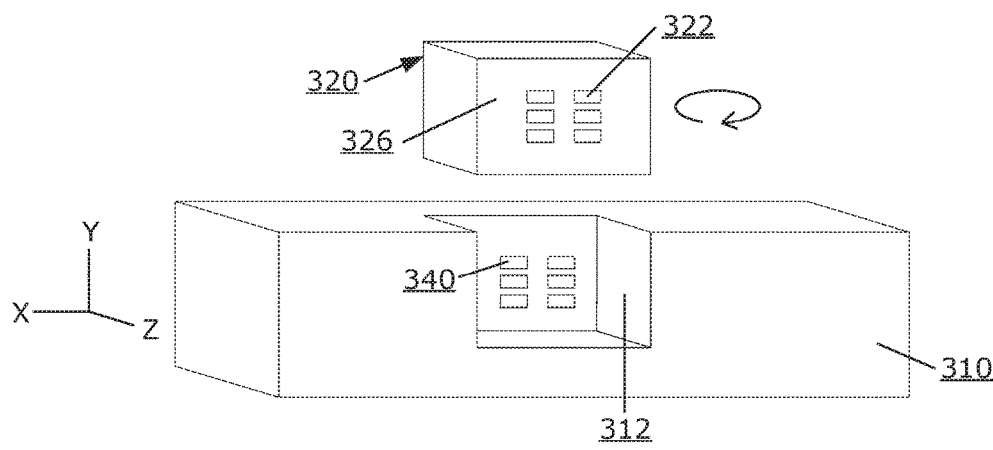
FIG. 3C illustrates the microphone module of FIG. 3B in a second detached state.
Figure 3D:
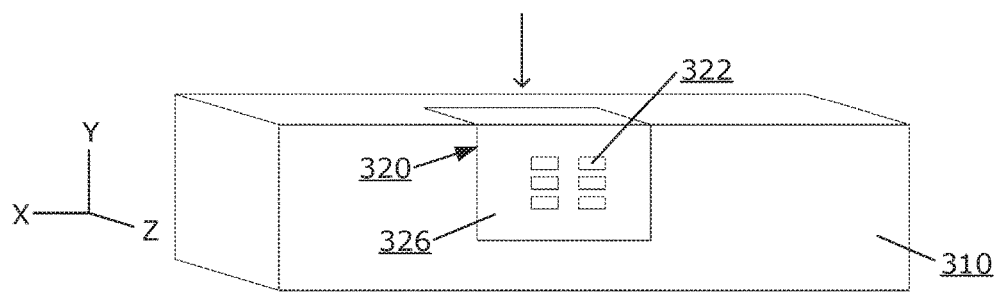
FIG. 3D illustrates the microphone module of FIG. 3A in a second attached state.

FIG. 3C shows the microphone module 320 manipulated to be rotated about the Y axes to expose a rear façade 326 of the microphone module 320, which can be further manipulated to electrically connect with the contact terminals of the housing. Referring back to FIG. 3A, the contact terminals 322 of the microphone module 320 are shown in contact with the contact terminals 340 of the housing 310, coinciding with the attached state of FIG. 3A. In both FIGS. 3B and 3C, the microphone module 320 is in a detached state since the contact terminals 340 of the housing 310 are physically separate and/or misaligned with the contact terminals 322 of the microphone module 320. FIG. 3D shows the microphone module 320 manipulated to be translated down along the Y axes and positioned within the opening 312 of the housing 310. Even though the microphone module 320 is positioned within the housing 310, FIG. 3D shows the microphone module in a detached state since the contact terminals 322 of the microphone module 320 remain separate from the contact terminals 340 of the housing 310.

In variations, a housing can be structured to provide for translating the microphone module 320 along the X axes and within the housing 310 (i.e., sliding along the X axes) until the microphone module 320 achieves a detached state. Such an example does not require the microphone module 320 to be rotated about the Y axes in order to create a physical separation between the contact terminals 322 of the microphone module 320 and the contact terminals 340 of the housing 310. In reference to FIG. 3A, one example of a push button mechanism can include a user depressing the microphone module 320 along the Z axes so the push button mechanism causes the microphone module 320 to protrude out from the housing 310 along the Z axes (in a direction opposite from the direction applied by the user to depress the push button) so as to create the physical separation between contact terminals 322 and 340 to achieve a detached state. This example produces a detached state due to the separation of the contact terminals 322 and 340, even though the contact terminals 322 and 340 remain aligned with one another. In reference to FIG. 3B, other examples include a partial translation of the microphone module 320 up along the Y axes so far as to create the physical separation between the contact terminals 322 of the microphone module 320 and the contact terminals 340 of the housing 310, wherein the microphone module 320 merely protrudes from the housing 310, but not so far as to completely remove the microphone module 320 from the housing 310.

Figure 4:
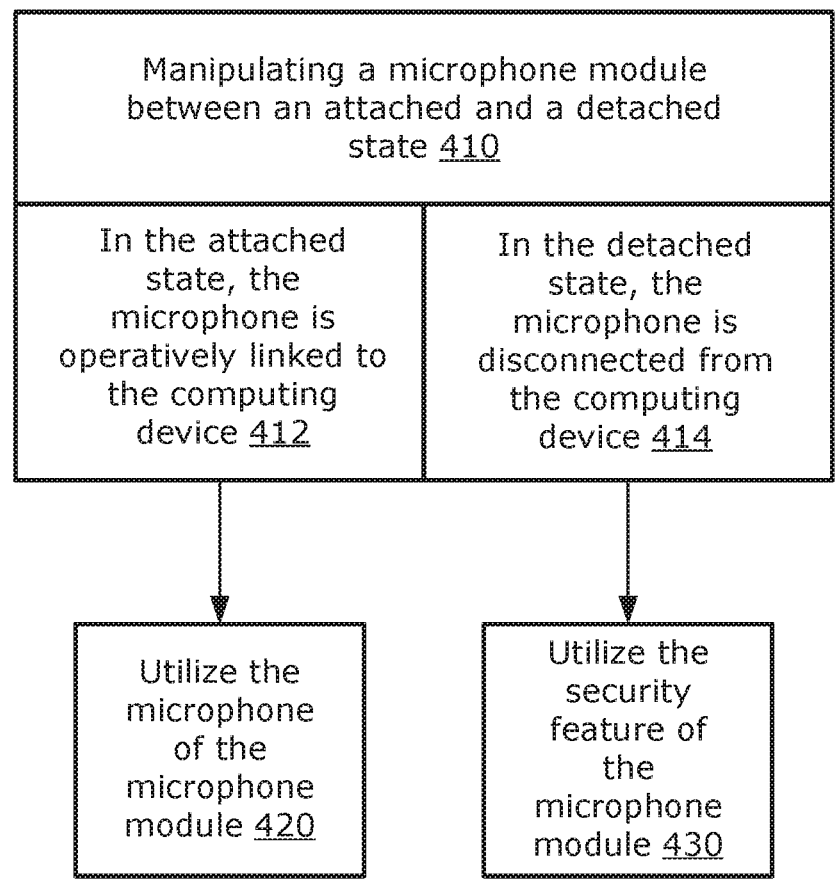
FIG. 4 illustrates an example method for operating a computing device by manipulating a microphone module.

FIG. 4 illustrates an example method for operating a computing device by manipulating a microphone module. A method such as described by an example of FIG. 4 can be implemented using, for example, components described with examples of FIG. 1A through FIG. 1C, FIG. 2A through FIG. 2C, or FIG. 3A through FIG. 3D. Accordingly, references may be made to other examples for purposes of illustrating a suitable element or component for performing an element of the method being described.

Referring to FIG. 4, a user can manipulate a microphone module 120 between an attached and a detached state (410). In the attached state, a microphone 124 of the microphone module 120 is operatively linked to the computing device 100 (412). In the detached state, the microphone is disconnected from the computing device (414). In the detached state, the microphone 124 can be disconnected from the computing device 100 (i.e., no electrical connection between the microphone and the computing device) but still be physically positioned within the housing of the computing device.

When a user manipulates the microphone module 120 to be in the attached state, the user can utilize the microphone 124 of the microphone module 120 (420). In the attached state, the user can utilize the microphone 124 of the microphone module 120 in conjunction with the computing device 100 for various uses (e.g., online meetings, video conferencing, etc.).

When the user manipulates the microphone module 120 to be in the detached state, the user can utilize the security feature of the microphone 124 (430). As discussed above in reference to FIG. 3A through FIG. 3D, the user can manipulate the microphone module in a variety of ways, including along the X, Y or Z axes of the housing 110 of the computing device 100 to either partially remove, completely remove, or completely remove and reposition the microphone module 120 in order to produce the detached state. In addition, utilizing the security feature of the microphone module 120 includes eliminating the electrical connection between the microphone 124 and the computing device 100 so the microphone 124 is inoperable by the user in conjunction with the computing device 100. This feature provides security to the user in that prevention of an electrical connection between the microphone 124 and the computing device 100 also prevents access to the microphone 124 by an individual that compromises the security of a computing device 100 that houses the microphone 124.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A computing device comprising:
   a housing to contain one or more electrical components, the one or more electrical components including an audio processing resource; and
   a microphone module, including a microphone, the microphone module being connected to the housing and selectively manipulatable between an attached state and a detached state, wherein in the attached state, the microphone is operatively linked to the one or more electrical components, and in the detached state, the microphone is disconnected from the one or more electrical components,
   wherein the microphone module in the detached state maintains the microphone in physical suspension relative to a contact terminal of the housing, in order to prevent an electrical connection from being formed between the microphone and the contact terminal.

2. The computing device of claim 1, wherein the contact terminal is to electrically connect the microphone in the attached state to the one or more electrical components.

3. The computing device of claim 1, wherein the microphone module includes an electronic circuit connected to the microphone and a cover to encase the microphone and the electronic circuit.

4. The computing device of claim 3, wherein the cover includes an opening on one side and the contact terminal on another side, the contact terminal connected to the electronic circuit of the microphone module.

5. The computing device of claim 1, wherein the microphone module in the attached state is electrically connected to the one or more electrical components via the contact terminal.

6. The computing device of claim 1, wherein the microphone module in the detached state maintains a separation between the microphone and the contact terminal.

7. The computing device of claim 1, wherein the microphone module in the detached state maintains the microphone in an alignment that prevents formation of an electrical connection between the contact terminal and the microphone.

8. The computing device of claim 1, wherein selectively manipulating the microphone module includes removing the microphone module from the housing or manipulating the microphone module within the housing to produce the attached or detached state.

9. The computing device of claim 1, wherein the microphone module is structured to visually indicate the detached state to a user.

10. The computing device of claim 9, wherein the microphone module is structured to protrude from the housing to visually indicate the detached state to the user.

11. A method for operating a computing device, the method comprising:
  manipulating a microphone module between an attached state and a detached state, wherein in the attached state, a contact terminal disposed on an external surface of the microphone module is coupled to one or more electrical components of a housing of the computing device, and in the detached state, the contact terminal is disconnected from the one or more electrical components; and
  utilizing a microphone feature or a security feature of the microphone module.

* * * * *